H., C. A., & J. H. PEAVEY,

Said H. PEAVEY assignor to C. A. & J. H. PEAVEY, aforesaid.

CANT HOOK.

No. 10,336. Reissued June 5, 1883.

Witnesses;

Chas. H. Kimball

Alfred W. Call

Inventors.

H. Peavey

C. A. Peavey

J. H. Peavey

Per William Henry Clifford

Atty.

N. PETERS. Photo-Lithographer, Washington, D. C.

UNITED STATES PATENT OFFICE.

HIRAM PEAVEY, CHARLES A. PEAVEY, AND JAMES H. PEAVEY, OF BANGOR, MAINE; SAID HIRAM PEAVEY ASSIGNOR TO CHARLES A. PEAVEY AND JAMES H. PEAVEY, AFORESAID.

CANT-HOOK.

SPECIFICATION forming part of Reissued Letters Patent No. 10,336, dated June 5, 1883.

Original No. 224,605, dated February 17, 1880. Application for reissue filed January 14, 1882.

*To all whom it may concern:*

Be it known that we, HIRAM PEAVEY, CHARLES A. PEAVEY, and JAMES H. PEAVEY, of Bangor, in the county of Penobscot and State of Maine, have invented certain new and useful Improvements in Cant-Hooks; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
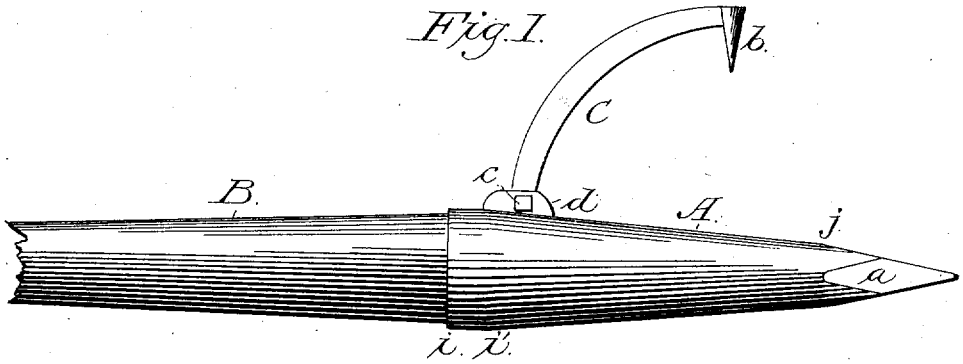
Figure 2:
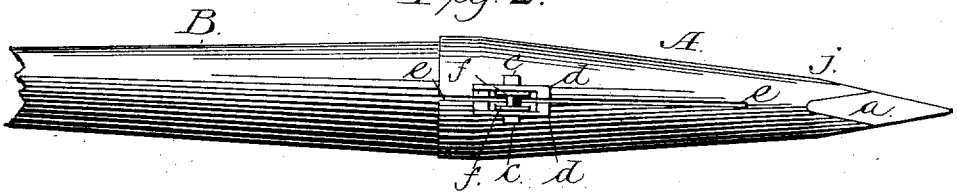
Figure 3:
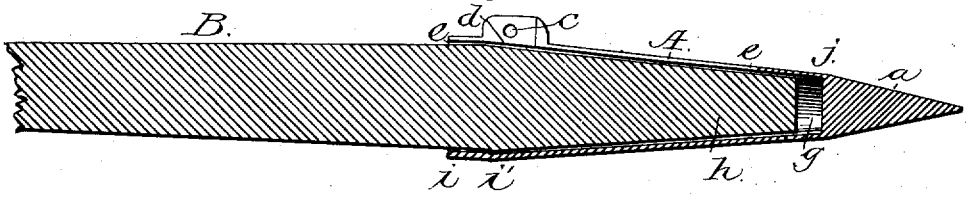
Figure 4:
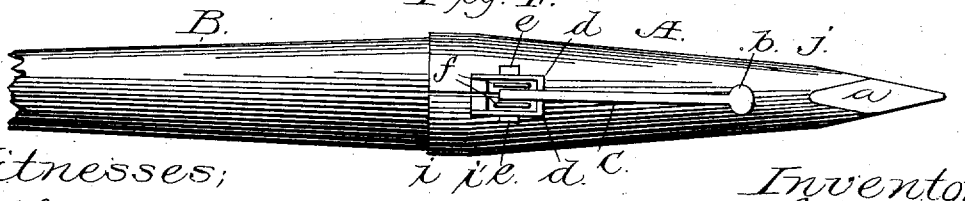

Figure 1 is a side view of our invention. Fig. 2 is a back view with the hook removed to show the slot or opening in the socket. Fig. 3 is a sectional view, showing how the handle fits into the socket. Fig. 4 is a rear view, showing the back of the hook.

Same letters show like parts.

Our invention relates to cant-hooks.

The object of our invention is to form a socket-pick for a cant-hook which shall be made integral or in one piece, so that the pick is much stronger than when made in one of the old ways, where a separate pick is driven into the wood of the handle and a ring encompasses the wood.

Another object of our invention is to make a spring-socket to the pick, so that the pick may be firmly fixed to the handle and readily detached from it, as herein shown and described.

Another object is to produce a hook of improved construction and operation.

The invention consists, first, in the adjustable socket-pick with the socket and pick in one piece and without any shoulder, as hereinafter described; second, in an adjustable spring-socket having a tapering and a straight part, a slit, flanges, and screw-bolt, as hereinafter set forth; third, in the combination of the adjustable socket-point, washers, and flanges and hook, as hereinafter set forth; fourth, in the combination, with two flanges and a bolt on the socket of the pick, of a curved hook with an enlarged width in the middle of the curved part and having a point of the form herein described.

A shows the pick. B is a handle. C is a hook. *a* is the point of the pick. *b* is the point of the hook C. *c* is a screw-bolt. *d d* are flanges on each side of the slot *e e*. *e e* is the slot. *f f* are washers. *g* is the lower end of the socket. *h* is the lower end of the handle. *i i'* indicate the contracting part of the socket.

The pick is constructed with the point *a* connected to and a part of the socket *g* and tapering from the tip up to the socket. In one form of making cant-hooks the point *a* was driven into the wood of the handle, which handle was encompassed by a ring at that point. There was always a shoulder formed at *j* by the end of the wood handle. This was a defect in the implement. When two logs lie close together side by side the point *a* of the cant-hook cannot readily be forced down between the logs on account of the shoulder *j*; but when the point *a* is formed on the socket, as in our invention, it has no shoulder at *j*, and can not only be forced down between two logs, but operates also as a wedge to separate them. There is also an advantage when it becomes necessary to pick ice to have a pick without any shoulder, so that it may be driven into the ice and act as a continuous wedge. It is often desirable to reach to a distance to hook into a log by sliding the pick over the top of the log and by catching the hook into the side of the log; but when the pick has the shoulder, as in the form above mentioned the shoulder, catches against the log and pushes it away, and thus prevents the hook from coming in contact with the log at all. This hook is used very much in quick water and on jams of logs, and when the cant-hook is used at the end of a log as a handspike, when made in one form of picks heretofore used, the shoulder at *j* often catches on the end of the upper log and prevents the point *a* from striking the under log. Where the shoulder (at *j*) thus catches and prevents the point *a* from striking the under log, danger is incurred to the lumberman. Another advantage of our method of construction is that, while the junction of the point with the other part of the implement is as strong as or stronger than it was before, it allows all the parts to be cast or forged connected together, and if made of steel, as is proposed, the economy of manufacture is very considerable.

As the socket *g* and the end *h* of the handle B are formed tapering for a certain distance, the socket is continued from *i* to *i'*, which may be of any desired length of the same diameter; or at the upper end the diameter may be diminished. This will operate to clutch the handle firmly, especially when the socket is clamped together by the screw-bolt *c* passing through the flanges *d d*, rising from the split socket and extending onto the straight part from *i* to *i'*. The socket is split or formed with a slot, *e e*, on what is generally used as the under side, and the flanges *d d* are formed on the sides of said slot. Through these flanges is passed a screw-bolt, *c*. It may have a nut on one end of it, or a thread may be cut into one of the flanges; then by means of the bolt *c* the socket *g* may be drawn together and clamped firmly to the handle. By loosening the screw-bolt the socket may be quickly and easily removed from the handle.

With one form heretofore in use of cant-hook where rings were used to hold the pick, if the handle or stock B became broken while in use on a drive remote from any inhabited place, such cant-hook became useless, because the aid of a blacksmith was necessary to put in a new handle, and it is not usual to have a blacksmith or a set of blacksmith's tools in a company of lumbermen at work on a stream. With our invention and the facility with which a new handle can be supplied, the injury can be promptly repaired by the ordinary lumberman, because it only requires the removal of the spring-socket by the loosening of the bolt *c* and the tightening of it on a new handle. No tools are required except a common wrench. The split or slot *e e* causes a slight spring in the point *a* when in use, which relieves to some extent the strain on the handle at the point of connection with the socket. As it would be inconvenient and unnecessary to have any other projections on the implement, the hook may be attached to and swing on the bolt *c*; but in order that the thickness of the hook may not interfere with the operation of the bolt in tightening the socket, the washers *f f* are used, so that one or both of the washers can be slipped out and the socket drawn together.

The hook C turns on the bolt *c*, and is curved, as shown. The point *b* is made round and extends to the back of the hook. The tapering form of the point *b* is continued through its whole length, so as to enable it to be easily disengaged from a log when the strain is removed. On the back or at its upper end it forms a flat circular head. (Seen at Fig. 4.) The curved part or shank is wider at about the middle of its length, where the most strain comes in its use, so that it may endure the strain without bending or breaking. When made after an old manner, the point often becomes buried in the wood of a log more than to the depth of the shank, and thus becomes fastened in the wood, so as to sometimes pull the handle of the implement out of the user's hands. Our point *b* avoids this trouble. By making the point round and extending it in that form to the back of the shank large enough to enlarge the end of the shank, as described, and give the point a sharp taper, the point readily disengages from the wood when the force is removed that forced it in, and thus no burying in or adhering in the wood occurs.

The socket is made lighter than any cant-hook of which we are aware.

We do not of course claim a cant-hook, broadly.

What we do claim, and desire to secure by Letters Patent, is—

1. The adjustable socket-point A of a cant-hook or handspike, so constructed that the point *a* and socket *g* shall be connected and integral, the point *a* tapering from the tip up to and in continuation of the socket part *g*, without any shoulder at *j*, the socket part *g* being rendered elastic and adjustable to the handle or stock B by means of the slot or split *e e*, flanges *d d*, and screw-bolt *c*.

2. The adjustable spring-socket *g* of the socket-point A, formed upon A and with a taper enlarging from the point *a* to *i'*, and changing to a straight or uniform size from *i'* to *i*, and having the split or slot *e e*, and flanges *d d*, and adjustable by means of the screw-bolt *c*.

3. The combination of the adjustable socket-point A, washers *f f*, and hook C, formed with a round tapering point, *b*, when used as the combined hook and point of a cant-hook, all as shown and described, and substantially as and for the purpose hereinbefore set forth.

4. In combination with the flanges *d d*, formed on the sides of the slot *e*, the socket *g*, the bolt *c*, and the washers *f f*, the curved hook C, having the point *b* made into and a part of said hook, made also of conical shape with a sharp taper, having a diameter at the upper end greater than the thickness of the curved hook, and formed at its upper end into a flat circular head, as herein set forth and described, the said curved hook C being greater in width at a certain point of the curve, as herein specified.

In testimony that we claim the foregoing we have hereunto set our hands this 28th day of December, 1881.

HIRAM PEAVEY.
CHARLES A. PEAVEY.
JAMES H. PEAVEY.

Witnesses:
F. H. CLERZUE,
OTTO F. YOUNGS.